US010816298B1

(12) United States Patent
Hall

(10) Patent No.: US 10,816,298 B1
(45) Date of Patent: Oct. 27, 2020

(54) CAM-OPERATED RAPID FIRE TRIGGERING DEVICE

(71) Applicant: Ronnie W. Hall, Rusk, TX (US)

(72) Inventor: Ronnie W. Hall, Rusk, TX (US)

(*) Notice: Subject to any disclaimer, the term of this patent is extended or adjusted under 35 U.S.C. 154(b) by 0 days.

(21) Appl. No.: 16/699,857

(22) Filed: Dec. 2, 2019

(51) Int. Cl.
*F41A 19/09* (2006.01)
*F16H 53/00* (2006.01)

(52) U.S. Cl.
CPC .............. *F41A 19/09* (2013.01); *F16H 53/00* (2013.01)

(58) Field of Classification Search
CPC .......... F41A 19/31; F41A 19/13; F41A 19/06; F41A 35/00; F41A 99/00; F41A 19/09; F41A 19/10; F41C 9/085; F41C 27/00; F16H 53/00
USPC ....... 74/567; 89/136, 132, 129.02; 42/69.01, 42/90, 106
See application file for complete search history.

(56) References Cited

U.S. PATENT DOCUMENTS

| 4,276,808 A * | 7/1981 | York ....................... F41A 19/09 89/136 |
| 4,532,852 A | 8/1985 | Hance et al. |
| 4,685,379 A | 8/1987 | Troncoso |
| 4,787,288 A | 11/1988 | Miller |
| 4,803,910 A | 2/1989 | Troncoso |
| 6,223,644 B1 * | 5/2001 | Troncoso ................ F41A 19/09 42/69.01 |

* cited by examiner

*Primary Examiner* — David H Bollinger
(74) *Attorney, Agent, or Firm* — Dale J. Ream

(57) ABSTRACT

A cam-operated rapid fire triggering device for use with a gun having a trigger includes a body member having a front and rear faces and the front and rear faces extending between a first and second ends, the body member having an elongate and planer configuration. The body member includes upper and lower edges, the upper and lower edges extending between the first and second ends, respectively. The body member defines a plurality of apertures separated from one another and positioned laterally between the first and second ends, each aperture extending between the first and second faces. The upper edge defines a plurality of alternating ridges and recesses positioned between the first and second end of the body member and configured to selectively bear against the trigger when the body member is pulled from side to side across the trigger.

14 Claims, 2 Drawing Sheets

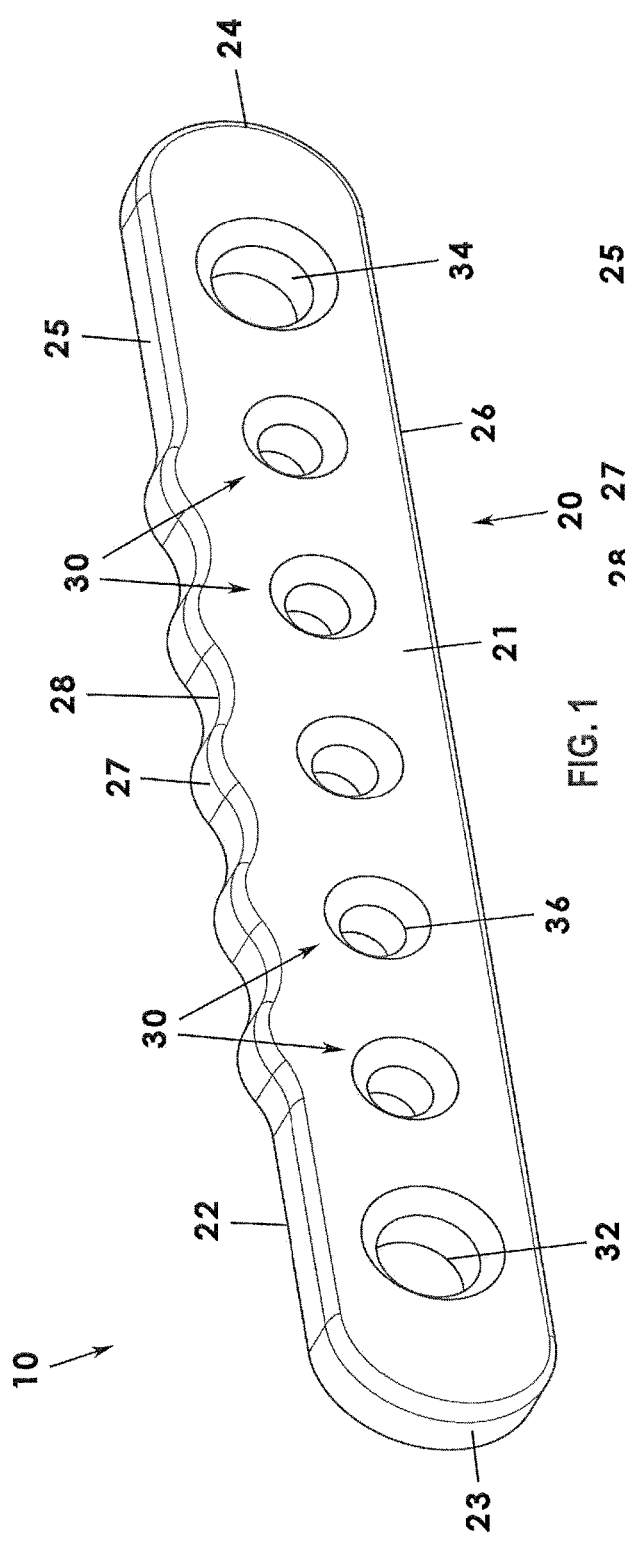
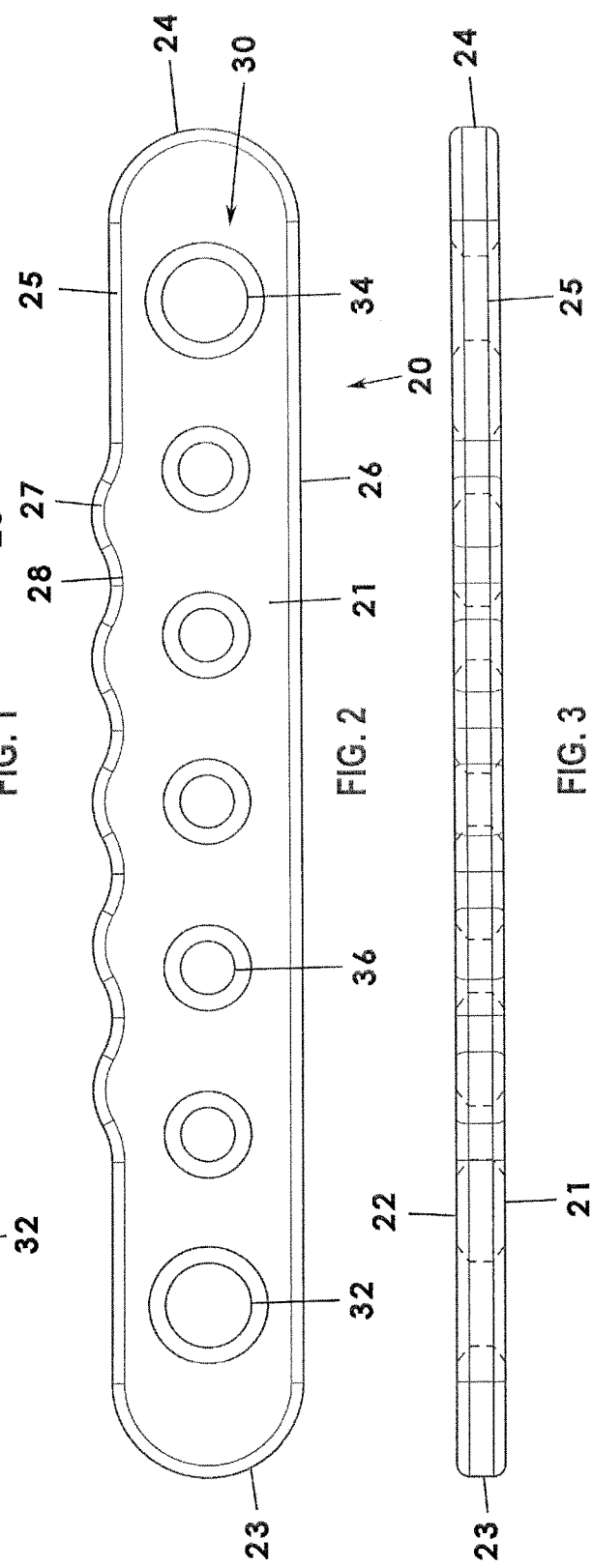
FIG. 1
FIG. 2
FIG. 3

CAM-OPERATED RAPID FIRE TRIGGERING DEVICE

BACKGROUND OF THE INVENTION

This invention relates generally to rapid fire devices for firearms and, more particularly, to a cam-operated rapid fire triggering device for activating multiple discharges of a firearm with a single pull of a cam configured device.

Typically, firing of a firearm requires multiple sequential pulls of a trigger. Although a gun can be mechanically modified to fire in rapid succession so long as the trigger is actuated, such modifications are generally illegal. Therefore, it would be desirable to have a mechanical device that may be applied to a firearm and that still allows a rapid firing of a gun without the user having to sequentially pull the trigger quickly.

Although various devices have been proposed in the art for automatically causing a semi-automatic firearm to fire in rapid sequential succession, there is still a need for a cam-operated rapid fire triggering device that repeatedly presses the trigger of the firearm via its cam edge structure.

SUMMARY OF THE INVENTION

A cam-operated rapid fire triggering device according to the present invention for use with a gun having a trigger includes a body member having a front face and a rear face opposite the front face and the front and rear faces extending between a first end and a second end opposed to the first end, the body member having an elongate and planer configuration. The body member includes an upper edge and a lower edge opposite the upper edge, the upper and lower edges extending between the first and second ends, respectively. The body member defines a plurality of apertures separated from one another and positioned laterally between the first and second ends, each aperture extending between the first and second faces. The upper edge defines a plurality of alternating ridges and recesses positioned between the first and second end of the body member and configured to selectively bear against the trigger when the body member is pulled from side to side across the trigger.

Therefore, a general object of this invention is to provide a cam-operated rapid fire triggering device for simulating the firing of a full automatic firearm.

Another object of this invention is to provide the cam-operated rapid fire triggering device, as aforesaid, that causes the rapid firing of multiple gunshot rounds by quickly pressing the trigger of the firearm by pulling the device across the trigger.

Still another object of this invention is to provide the cam-operated rapid fire triggering device, as aforesaid, that includes at least a chamfered aperture adjacent an end of the body member by which to pull the body member across the trigger of a firearm.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1 is a perspective view of a cam-operated rapid fire triggering device according to a preferred embodiment of the present invention;

FIG. 2 is a front view of the rapid fire triggering device as in FIG. 1;

FIG. 3 is a top view of the rapid fire triggering device as in FIG. 1.

DESCRIPTION OF THE PREFERRED EMBODIMENT

Figure 4:
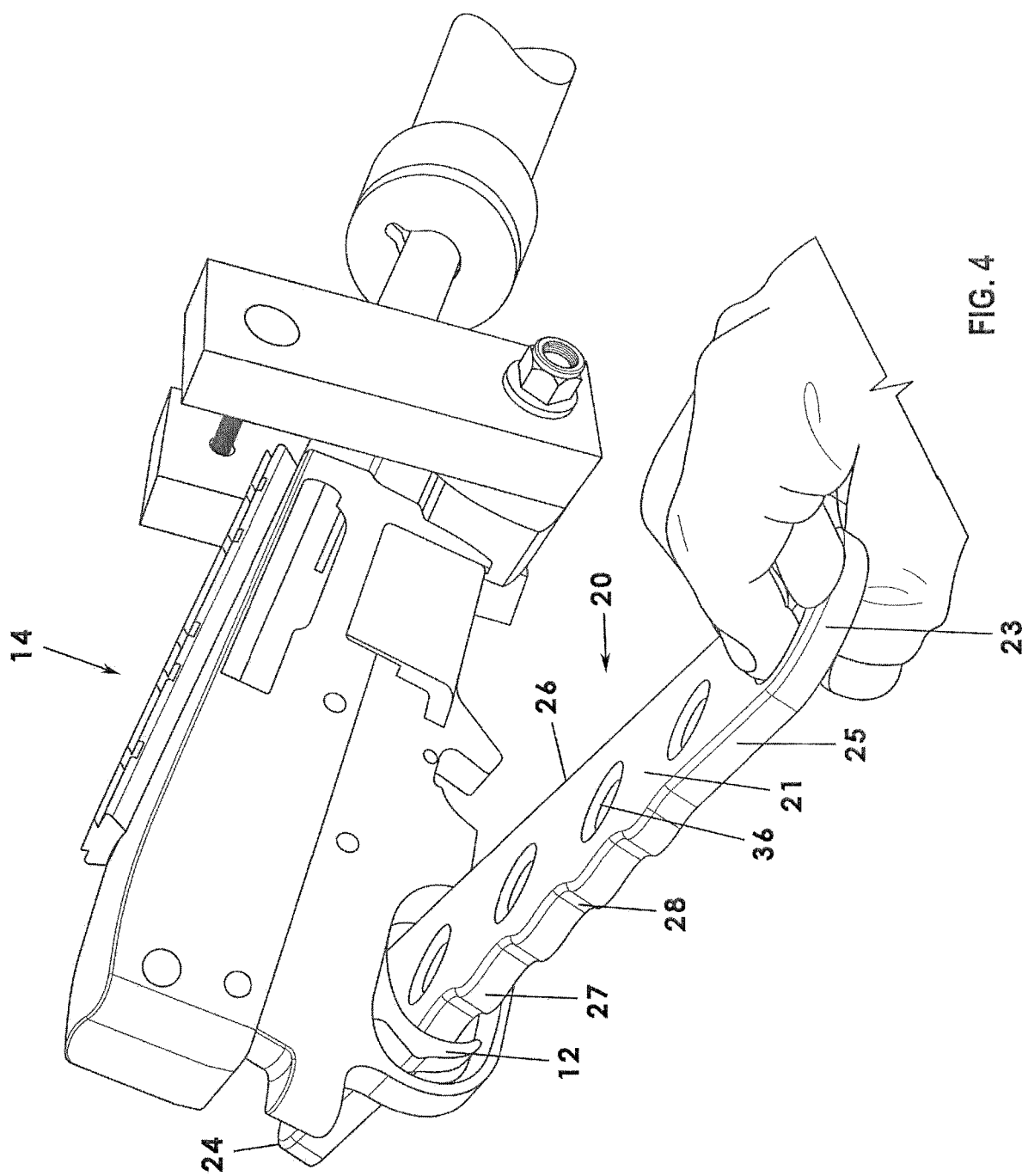
FIG. 4 is a perspective view of the rapid fire triggering device as in FIG. 1 illustrated in use triggering a firearm.

A cam-operated rapid fire triggering device 10 according to a preferred embodiment of the present invention will now be described in detail with reference to FIGS. 1 to 4 of the accompanying drawings.

The cam-operated rapid fire triggering device 10 includes a body member 20 having a front face 21 and a rear face 22 that are opposite one another and have planar surfaces. The body member 20 includes a first end 23 opposite a second end 24, i.e. at either ends of the front and rear faces. The body member 20 has an elongate and planar configuration, extending longitudinally between the first and second ends. In an embodiment, the body member 20 may have a length of about 8 inches. The body member 20 has a thin configuration separated by an upper edge 25 and an opposed lower edge 26. In other words, the upper and lower edges define the width dimension of the body member 20. The upper and lower edges extend linearly and longitudinally between the first and second ends. In an embodiment, the upper and lower edges may define a height of between 1.150 and 1.250 inches. Each end may have a radial configuration. More particularly, the first end 23 has a hemispherical configuration extending outwardly from the body of the body member 20. Likewise, the second end 24 has a hemispherical configuration extending outwardly from the body of the body member 20. Put simply, each end is rounded as shown in the illustrations.

With further reference to the upper edge 25, at least a portion of the upper edge 25 includes a plurality of alternating ridges 27 and recesses 28. Specifically, each ridge 27 is separated by a corresponding recess 28 and a corresponding ridge and recess is separated first by a downwardly sloping edge and then upwardly sloping edge. Preferably, each sloping edge is at a 20 degree slope although other slopes may work as well. It is each ridge that pushes the trigger 12 to fire the firearm 14 as will be described in further detail later. It will be understood by those skilled in the art that the combination of a ridge and recess define a cam action.

In another aspect, the body member 20 defines a plurality of apertures 30, each aperture extending through the body member 20 and between the front and rear face plates. Both the front and rear sides of a respective aperture are open so as to essentially define a bore between respective face plates. Each open side of a respective aperture has a chamfered edge or, specifically, is smooth, curved, or beveled. In a preferred embodiment, the plurality of apertures 30 includes a first end aperture 32 and a second end aperture 34 opposite the first end aperture 32 and includes a plurality of interior apertures 36 spaced apart between the first and second end apertures, 32, 34 respectively. Each of the end apertures 32, 34 has a diameter that is larger than a diameter defined by any of the interior apertures 36. In an embodiment, the diameter of each end aperture has a size and configuration that enables a user to grasp a corresponding end of the body member 20 (also referred to as a handle portion) for pulling across a trigger 12 as will be discussed later. For instance, each end aperture may have a diameter of 9/16 of an inch so as to accommodate a user's finger as described above. By contrast, a preferred diameter for each interior aperture 36 is ⅜".

In use, the body member 20 of the cam-operated rapid fire triggering device 10 may be positioned within the trigger guard of a firearm 14 and, accordingly, proximate and adjacent to the trigger 12, the body member 20 being positioned with the upper edge 25 with the plurality of ridges and recesses facing the trigger 12. Then, after stabilizing the gun, the user may grasp the handle portion of the body member 20 and pull it rapidly across the trigger 12, the ridges sequentially pushing against and actuating the trigger 12 to fire the gun. Accordingly, the firearm 14 is fired rapidly and simulates a fully automatic weapon.

It is understood that while certain forms of this invention have been illustrated and described, it is not limited thereto except insofar as such limitations are included in the following claims and allowable functional equivalents thereof.

The invention claimed is:

1. A cam-operated rapid fire triggering device for use with a gun having a trigger, said cam-operated rapid fire triggering device, comprising:
   a body member having a front face and a rear face opposite said front face and said front and rear faces extending between a first end and a second end opposed to said first end, said body member having an elongate and planer configuration;
   wherein said body member includes an upper edge and a lower edge opposite the upper edge, said upper and lower edges extending between said first and second ends, respectively;
   wherein said body member defines a plurality of apertures separated from one another and positioned laterally between said first and second ends, each aperture extending between said first and second faces; and
   wherein said upper edge defines a plurality of alternating ridges and recesses positioned between said first and second end of said body member and configured to selectively bear against the trigger when said body member is pulled from side to side across the trigger.

2. The cam-operated rapid fire triggering device as in claim 1, wherein said lower edge has a linear configuration.

3. The cam-operated rapid fire triggering device as in claim 1, wherein said plurality of apertures includes a first end aperture and a second end aperture and a plurality of interior apertures intermediate said first and second end apertures, said first and second end apertures defining a diameter that is larger than a diameter of said interior apertures.

4. The cam-operated rapid fire triggering device as in claim 3, wherein:
   said first and second end apertures have a diameter of 9/16 inches, respectively; and
   each interior aperture of said plurality of interior apertures has a diameter of ⅜".

5. The cam-operated rapid fire triggering device as in claim 4, wherein each aperture of said plurality of apertures has a chamfered configuration having a smooth contour.

6. The cam-operated rapid fire triggering device as in claim 3, wherein:
   said first end has a hemispherical configuration extending outwardly from said body member; and
   said second end includes a hemispherical configuration extending outwardly from said body member;
   said front and rear faces adjacent said first and second ends, respectively, and said first and second end apertures, respectively form first and second handle portions, respectively, by which a user grasps said body member for pulling said upper edge of said body member across the trigger.

7. The cam-operated rapid fire triggering device as in claim 1, wherein:
   said body member has a length between said first and second ends of 8 inches;
   said body member has a distance between said upper and lower edges of 1.150 inches; and
   said plurality of ridges and recesses are separated by sloping and ascending edges at a 20 degree angles, respectively.

8. A cam-operated rapid fire triggering device for use with a gun having a trigger, said cam-operated rapid fire triggering device, comprising:
   a body member having a front face and a rear face opposite said front face and said front and rear faces extending between a first end and a second end opposed to said first end, said body member having an elongate and planer configuration;
   wherein said body member includes an upper edge and a lower edge opposite the upper edge, said upper and lower edges extending between said first and second ends, respectively;
   wherein said upper edge defines a plurality of alternating ridges and recesses positioned between said first and second end of said body member and configured to selectively bear against the trigger when said body member is pulled from side to side across the trigger.

9. The cam-operated rapid fire triggering device as in claim 8, wherein said body member defines a plurality of apertures separated from one another and positioned laterally between said first and second ends, each aperture extending between said first and second faces.

10. The cam-operated rapid fire triggering device as in claim 8, wherein said plurality of apertures includes a first end aperture and a second end aperture and a plurality of interior apertures intermediate said first and second end apertures, said first and second end apertures defining a diameter that is larger than a diameter of said interior apertures.

11. The cam-operated rapid fire triggering device as in claim 10, wherein:
   said first and second end apertures have a diameter of 9/16 inches, respectively; and
   each interior aperture of said plurality of interior apertures has a diameter of ⅜".

12. The cam-operated rapid fire triggering device as in claim 10, wherein:
   said first end has a hemispherical configuration extending outwardly from said body member; and
   said second end includes a hemispherical configuration extending outwardly from said body member;
   said front and rear faces adjacent said first and second ends, respectively, and said first and second end apertures, respectively form first and second handle portions, respectively, by which a user grasps said body member for pulling said upper edge of said body member across the trigger.

13. The cam-operated rapid fire triggering device as in claim 10, wherein each aperture of said plurality of apertures has a chamfered configuration having a smooth contour.

14. The cam-operated rapid fire triggering device as in claim 8, wherein:
   said body member has a length between said first and second ends of 8 inches;

said body member has a distance between said upper and lower edges of 1.150 inches; and said plurality of ridges and recesses are separated by sloping and ascending edges at a 20 degree angles, respectively.

\* \* \* \* \*